United States Patent Office 3,388,981
Patented June 18, 1968

3,388,981
METHOD OF MAKING GLASS POLISHING
COMPOSITION
John S. Sieger, Allison Park, Pa., assignor to Pittsburgh
Plate Glass Company, Pittsburgh, Pa., a corporation of
Pennsylvania
No Drawing. Filed Sept. 30, 1966, Ser. No. 583,467
4 Claims. (Cl. 51—293)

ABSTRACT OF THE DISCLOSURE

A glass polishing composition is produced by dissolving zirconyl chloride in water to provide a solution containing 0.05 to 3.5 percent by weight dissolved zirconium, the pH value of the solution is adjusted to a range of 1.5 to 3.0 and zirconium oxide is added so that there is dispersed therein between 0.25 and 10 percent by weight zirconium oxide as an abrasive.

---

The present invention relates to improvements in glass polishing. More particularly, the present invention relates to an improved method of producing a glass polishing composition and to the particular glass polishing composition so produced.

It is known in the art to polish glass with materials such as rouge, zirconium oxide, and rare earth abrasives containing cerium oxide. One of the difficulties in utilizing zirconium compounds is the expense incurred purchasing zirconium oxide as the abrasive material for a glass polishing composition. Another difficulty is the tendency of many zirconium oxides to form surface defects in certain polishing operations. Because cost and quality of polish dictate in great measure the advisability of utilizing one glass polishing abrasive over another, glass polishing compositions employing zirconium oxides present certain serious economic difficulties.

In accordance with the invention described in the copending application of John S. Sieger and Donald E. Cox, Ser. No. 403,980, filed Oct. 15, 1964 and now abandoned, entitled, "Glass Polishing Process and Composition," a method of polishing glass has been devised utilizing zirconium oxide, and new and novel glass polishing compositions have been discovered which render the use of zirconium oxide abrasive more economical by increasing the effectiveness of zirconium oxide as a glass polishing abrasive and minimizing its tendency to form defects. Under certain conditions, the novel compositions therein disclosed possess vastly superior glass removal rates than those commonly experienced with conventional rouge-type compositions employed today in the plate glass making industry.

In accordance with the invention described and claimed in the aforesaid application, a slurry containing from about 0.25 to 10 percent by weight $ZrO_2$ is prepared. The slurry is an aqueous suspension of $ZrO_2$ in the weight percentages above indicated, and contains a certain but definite dissolved quantity of soluble zirconium. The soluble zirconium is supplied to the aqueous suspension in the form of zirconyl nitrate or zirconyl hydroxychloride. The zirconyl nitrate or hydroxychloride is utilized in quantities sufficient to provide on a weight basis between about 0.05 and 3.5 percent by weight soluble zirconium in the resulting solution. By "soluble zirconium" in the aforesaid application and also in the following description is meant all the zirconium in the system exclusive of that in the zirconium oxide abrasive. It was found in accordance with the invention described in the aforesaid application that by a careful regulation of the soluble zirconium content of a given solution, the abrasive concentration of the glass polishing slurry may be lowered to a very small value, one percent or less, for example, and still a satisfactory removal rate of glass achieved during a glass polishing operation. In determining the quantity of abrasive material which should be employed in the glass making compositions of that invention, the soluble zirconium content of the aqueous slurry was correlated to the zirconia or $ZrO_2$ content, because lower percentages of solid zirconia are capable of being employed when the soluble zirconium content is increased.

In the practice of the invention described in the aforesaid application, consideration of critical importance resides in the maintenance during operation of pH values of the aqueous glass polishing slurry within certain and definite ranges. It was found in accordance with that invention that a pH of the aqueous suspension must be maintained within the range of about 1.5 to 4.5 in order to render the glass polishing compositions effective in producing high rates of glass removal during a glass polishing operation. Operations outside of this range give rise to glass removal rates which are not satisfactory for one or more reasons.

The particular form which the zirconium oxide abrasive material takes does not appear to be of critical importance in the glass making compositions contemplated therein, and zirconium oxides of many types may be employed. It is preferable to employ a zirconium oxide which has a high bulk density, such as on the order of 30 to 50 pounds per cubic foot. Materials of this type have been found to be extremely efficient in removing glass, but a zirconium oxide of bulk density of higher or lower values may be employed with ease. The important consideration is that zirconium nitrate or hydroxychloride contained in the aqueous slurry of $ZrO_2$ must have present in that solution forming the slurry somewhere between about 0.05 and 3.5 percent soluble zirconium and be maintained in a pH range of between about 1.5 to about 4.5. The soluble zirconium in the solution exhibits an effect upon the abrasive qualities of the $ZrO_2$ or zirconia contained in the slurry so that superior glass removal rates are readily achieved. In the absence of the dissolved zirconium typical glass polishing compositions containing $ZrO_2$ do not function in a manner sufficient to enable them to be satisfactory for many polishing operations, such as for plate glass. Without dissolved zirconium and the critical pH range, the slurry of zirconia cannot compete on an economic basis with the conventional rouge-type material due to the low rate of glass removal resulting therefrom, as well as its tendency to form defects on the glass surface.

In accordance with the present invention a glass polishing composition is prepared by dissolving zirconyl chloride (zirconium oxychloride, $ZrOCl_2$) in water and adding lime (calcium hydroxide) to the solution, if necessary, to adjust the pH value of the solution to a value between 1.5 and 3.0, depending upon the quantity of soluble zirconium in the solution. The zirconyl chloride used may include water of hydration, so that the chemical formula could be, for example, $ZrOCl_2 \cdot 8H_2O$. Lime is used to adjust the pH value of the solution although sodium hydroxide and/or potassium hydroxide can be used for the same purpose. To this solution, or to the water in which the zirconyl chloride is added zirconium oxide ($ZrO_2$) is added to provide the abrasive in the polishing composition. The lime may be a commercial grade which could include minor quantities of impurities. The impurities, if present, do not lessen the glass removal rate.

The removal rates of the polishing composition of this invention are generally as high as, and at times higher than, those of the copending application. It has also been found that there is an economic advantage in using the polishing composition of this invention in lieu of the conventional rouge-copperas water polishing composition generally in use today. Thus, ground and polished plate glass can be produced more economically than ever before.

In preparing the polishing composition of this invention, sufficient zirconyl chloride is dissolved in water to provide a solution containing at least between 0.05 and 3.5 percent by weight soluble zirconium and perhaps higher. Generally, the quantity of zirconyl chloride is between 0.10 and 10 percent by weight of the water. However, economic consideration dictates the quantity of soluble zirconium in the solution, so that lower percentages are more attractive economically. Zirconyl chloride is easily dissolved in water to produce an acidic solution.

The pH value of the solution may be adjusted to the desired value of between 1.5 and 3.0, when necessary. Lime is used to adjust the pH value of the solution, as mentioned above.

To the solution so produced, a quantity of zirconium oxide is added while the solution is being agitated. Generally from 0.25 to 10 percent by weight zirconium oxide is added to the solution to produce the polishing composition. Of course, the zirconium oxide may be added to water before the addition of zirconyl chloride, if desired.

For a more complete understanding of the present invention, reference is made to the following examples which are illustrative of methods which may be employed in using the solution produced in accordance with the present invention. All polishing examples given herein below were run on a laboratory test machine.

The test machine consisted of a driven, rotating, horizontal table on which a glass plate is held by vacuum. A felt-faced polishing tool is lowered onto the glass and is made to rotate by driving it from above and also is made to oscillate across the glass. Abrasive slurry is dropped onto the glass beside the rotating polishing block. The various speeds of rotation and oscillation and the feed rate of the abrasive and the pressure on the glass are controlled to give reproducible results. The device contains a smooth, circular metal table equipped with a central vacuum connection. The table is 19 inches in diameter and in operation a flat, 19 inches in diameter by ¼ inch thick, circular glass test plate is held on the table by vacuum. A piece of cloth separates the glass from the metal to prevent breaking of the glass. The table and glass are driven as a unit at a controlled speed by an electric motor. The polishing block consists of a solid 10-inch diameter cattle-hair felt cemented to a metal back plate. The plate is attached through a second metal adapting plate to a rotating vertical shaft and is arranged to permit positive driving of the polishing block by a second motor. In operation the block is driven in the same direction as the glass. The entire block and shaft are oscillated across the surface of the rotating glass by a third motor, so that the rotating periphery of the felt block overhangs the edge of the glass by one inch at the furthermost point of the oscillation. At the center of the oscillation stroke the center of the block shaft is about one inch from the center of the table. The pressure on the felt is regulated by the addition of weights to the top of the shaft. Abrasive slurry is fed, at a controlled rate, by a pump from an agitated slurry reservoir, to the top surface of the glass at a point about midway between the center and edge of the plate. Concentrations of abrasive and additives and the pH of the slurry were adjusted before beginning the polishing operation. Provision was made for flushing residual abrasive slurry off the plate with water after completion of the test.

Before each series of experiments detailed in the examples below, a "break-in" period of operation, usually of about 20 minutes, was employed to condition the polishing pad with the slurry to be tested and enhance the reproducibility of results.

For comparison of the results of the examples below, a 6.5% zirconium oxide polishing slurry ($ZrO_2$ in water without "soluble zirconium") with a pH value of 7.2 was used on the test machine, as described, and for two 20-minute tests, the removal was measured to be 1.15 grams and 1.35 grams.

A 3% zirconium oxide polishing slurry ($ZrO_2$ in water without soluble zirconium) with the pH value adjusted by the addition of hydrochloric acid to 1.9 was used on the test machine. The removal was measured to be 0.74 gram for a 20-minute test.

A rouge-copperas water polishing slurry (7.0° Baume) and a pH value of 3.3 was produced by adding 244 grams rouge and 81 grams copperas to 4675 cubic centimeters water and used on the test machine. The removal was measured to be 2.4 grams for a 20-minute test.

Example I

A slurry was prepared by adding 124 grams of zirconyl chloride ($ZrOCl_2 \cdot 8H_2O$) to 3380 cubic centimeters of water. The pH value was measured and found to be 1.23. The solution was divided into two portions. The pH value of one portion of the solution was adjusted to 2.08 by adding 5.56 grams of commercial lime. 123 grams of zirconium oxide ($ZrO_2$) was added to this portion of the solution as the abrasive. The slurry contained 1.0% soluble zirconium and 6.54% zirconium oxide.

After a 20-minute test on the test machine the glass removal was measured and found to be 4.25 grams.

This removal materially exceeds that measured when using a 6.5% zirconium oxide-water slurry, a 3% zirconium oxide-water slurry and the rouge-copperas polishing slurry, all under the same conditions.

The finish was examined and found to be good.

Example II

To the other portion of the solution described in Example I, 5.56 grams of commercial lime was added to adjust the pH value of this other portion of the solution to 2.08. Again, 123 grams of zirconium oxide ($ZrO_2$) was added to the solution as the abrasive. This portion of the solution was held overnight before use.

For a 20-minute test on the test machine the glass removal was measured to be 4.34 grams.

The finish was inspected and determined to be good.

Example III

A slurry was prepared using 4717 cubic centimeters of water, 110.8 grams of zirconyl chloride as $ZrOCl_2 \cdot 8H_2O$, 8.5 grams of lime and 162.5 grams of zirconium oxide.

The pH value of the slurry was 2.0 and the slurry contained 0.625% soluble zirconium and 3.25% zirconium oxide.

For a 20-minute test on a standard test machine, the glass removal was measured to be 4.00 grams. The finish was acceptable.

I claim:

1. A method of producing a glass polishing composition comprising, dissolving a quantity of zirconyl chloride in water to provide a solution containing from 0.05 to 3.5 percent by weight dissolved zirconium, adjusting the pH value of the zirconium-containing solution to a range of 1.5 to 3.0, and adding zirconium oxide to said solution so that there is dispersed therein between 0.25 and 10 percent by weight zirconium oxide as an abrasive.

2. A method as recited in claim 1 wherein said pH value is adjusted by adding calcium hydroxide.

3. A method as recited in claim 1 wherein said pH value is adjusted to a value of between 1.7 and 2.3.

4. A method as recited in claim 1 wherein the quantity of zirconyl chloride as $ZrOCl_2 \cdot 8H_2O$ is between 0.10 percent and 10 percent by weight of the weight of the water.

References Cited

UNITED STATES PATENTS

| | | |
|---|---|---|
| 2,955,031 | 10/1960 | Bliton et al. |
| 2,996,369 | 8/1961 | Harris et al. |
| 3,071,455 | 1/1963 | Harman et al. |
| 3,097,083 | 7/1963 | Silvernail. |
| 3,123,452 | 3/1964 | Harris et al. |
| 3,131,039 | 4/1964 | Nonamaker. |
| 3,254,949 | 6/1966 | Clearfield. |

DONALD J. ARNOLD, *Primary Examiner.*